United States Patent
Martens et al.

(10) Patent No.: US 7,977,521 B2
(45) Date of Patent: Jul. 12, 2011

(54) OXYGENATE TO OLEFINS PROCESS INVOLVING SUPERCRITCAL CONDITIONS

(75) Inventors: Luc R. M. Martens, Meise (BE); Stephen N. Vaughn, Kingwood, TX (US); John R. Shutt, Merchtem (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 468 days.

(21) Appl. No.: 12/136,843

(22) Filed: Jun. 11, 2008

(65) Prior Publication Data

US 2009/0018378 A1   Jan. 15, 2009

Related U.S. Application Data

(60) Provisional application No. 60/949,081, filed on Jul. 11, 2007.

(51) Int. Cl.
*C07C 1/00* (2006.01)

(52) U.S. Cl. ........ 585/639; 585/638; 585/640; 585/906; 585/910; 502/85; 502/214; 204/157.15; 204/157.6

(58) Field of Classification Search ................. 585/638, 585/639, 640, 906, 910; 502/85, 214; 204/157.15, 204/157.6

See application file for complete search history.

(56) References Cited

U.S. PATENT DOCUMENTS

| | | | |
|---|---|---|---|
| 4,814,541 A | 3/1989 | Lewis | |
| 4,849,575 A | 7/1989 | Lewis | |
| 4,973,792 A | 11/1990 | Lewis et al. | |
| 6,046,373 A | 4/2000 | Sun | |
| 2002/0087041 A1* | 7/2002 | Kuechler et al. | 585/638 |

* cited by examiner

*Primary Examiner* — Prem C Singh
(74) *Attorney, Agent, or Firm* — Kevin M. Faulkner; David M. Weisberg

(57) ABSTRACT

This invention, in one embodiment, is drawn to a process for forming olefin product by contacting an oxygenate with an olefin-forming catalyst under supercritical conditions to form an olefin product. This invention also relates to methods for activating molecular sieve catalyst, regenerating molecular sieve catalyst, and forming and/or disposing a co-catalyst within a molecular sieve catalyst, each under supercritical conditions.

14 Claims, No Drawings

OXYGENATE TO OLEFINS PROCESS INVOLVING SUPERCRITCAL CONDITIONS

CROSS-REFERENCE TO RELATED APPLICATIONS

This application claims the benefit of U.S. Application Ser. No. 60/949,081, filed Jul. 11, 2007, the contents of which are incorporated by reference in their entirety.

FIELD OF THE INVENTION

This invention relates to a method for forming olefin product, activating molecular sieve catalyst, regenerating molecular sieve catalyst, and a method for forming a co-catalyst within a molecular sieve catalyst at supercritical conditions. More specifically, this invention relates to a method for forming olefin product from oxygenate feed by contacting the oxygenate with an olefin-forming catalyst under supercritical conditions, wherein the oxygenate feed can be under supercritical conditions, the reactor can be operated under supercritical conditions, the catalyst can be activated at supercritical conditions, can be pre-treated with a pre-treatment composition at supercritical conditions, and/or can be regenerated with a supercritical fluid.

BACKGROUND OF THE INVENTION

Olefins, particularly ethylene and propylene, are desirable as a feed source for making derivative products such as oligomers, e.g., higher olefins, and polymers such as polyethylene and polypropylene. Olefin feed sources have traditionally been produced by cracking petroleum feedstocks.

Oxygenate feedstocks, however, are becoming an alternative to petroleum feedstocks for making olefins, particularly large quantities of ethylene and propylene, for the production of higher olefins and plastic materials. In general, the olefins are formed by contacting the oxygenate components, such as methanol, with a molecular sieve catalyst to catalytically convert the oxygenates to olefins. These types of processes are generally referred to as oxygenate-to-olefins and methanol-to-olefins (collectively referred to herein as MTO) processes.

Many of the MTO processes are carried out using fluidized bed type reactors. Such reactors are generally operated at low pressures and elevated temperatures, using a molecular sieve type catalyst. Operating at supercritical conditions has also been suggested.

U.S. Pat. No. 4,849,575 (Lewis) discloses a process for producing olefins. In a step (a), hydrogen and at least one carbon oxide are contacted in a first reaction zone at conditions effective to chemically react the hydrogen and carbon oxide and produce at least one product, e.g., methanol, in the effluent of the first reaction zone. In a step (b), the effluent containing the product is contacted in a second reaction zone at conditions effective to chemically react the product and produce olefins in the effluent of the second reaction zone. In a step (c) an olefin-enriched product is recovered from the effluent of the second reaction zone; and in a step (d) at least one of hydrogen and at least one carbon oxide from the effluent of the second reaction zone are subjected to step (a). In certain instances, it is preferred that the step (b) contacting conditions be such that the contacting temperature exceed the critical temperature of the first reaction zone effluent product or products, e.g., methanol. In other words, in certain embodiments, such product or products are preferably in the supercritical state at the step (b) contacting conditions.

U.S. Pat. No. 4,973,792 (Lewis et al.) discloses a process for catalytically converting a feedstock into a product. In a step (a) the feedstock is contacted with a fluidized mass of solid particles comprising crystalline microporous three dimensional solid catalyst in a reaction zone at conditions effective to convert the feedstock into the product. In a step (b) the particles in the reaction zone are contacted with a first purge medium to reduce the amount of at least one of the feedstock and the product in contact with the particles. In a step (c) the particles in the reaction zone are contacted with regeneration medium at conditions effective to improve at least one catalytic property of the catalyst, provided that steps (a), (b) and (c) are repeated periodically. In certain instances, it is preferred that the feedstock/catalyst contacting conditions be such that the contacting temperature exceed the critical temperature of the feedstock. In other words, in certain embodiments, the feedstock is preferably in the supercritical state at the step (a) feedstock/catalyst contacting conditions.

U.S. Pat. No. 6,046,373 (Sun) discloses a method for preparing a catalyst and the use of such catalyst for converting an oxygenate feed to olefins. The catalyst is modified or treated with the aid of electromagnetic energy. The process may be carried out in a liquid, supercritical fluid, a mixed vapor/liquid, or a mixed vapor/supercritical fluid phase.

It would be beneficial to improve the various methods of converting oxygenates to olefins. Methods that result in increase of throughput, reduction in reactor size, increase in efficiency, increase in product in specificity and increase in product production would be particularly desirable.

SUMMARY OF THE INVENTION

This invention provides improved methods of converting oxygenates to olefins and methods that relate to that conversion. The various improvements result in an increase of throughput, a reduction in reactor size, an increase of efficiency, an increase of product specificity and/or an increase of product production.

According to one aspect of the invention, there is provided a process for forming olefin product. The process includes contacting, under supercritical conditions, oxygenate with an olefin-forming catalyst to form an olefin product comprising olefin, water and unreacted oxygenate. Pressure, temperature, or a combination of pressure and temperature of the olefin product is reduced below supercritical, and at least a portion of the olefin is separated from the water and unreacted oxygenate.

In one embodiment, the supercritical oxygenate is at a pressure of at least 90 bar. In another embodiment, the supercritical oxygenate is at a temperature of at least 240° C. In either of these two embodiments, the oxygenate can be supercritical at or near the reactor inlet, regardless of whether or not the oxygenate is maintained in a supercritical state throughout the reactor. In another embodiment, the reactor can be operated under supercritical conditions, i.e., such that the reactants, products, and byproducts are maintained at a supercritical temperature and pressure (e.g. at a temperature of at least 300° C. and a pressure of at least 220 bar).

According to another aspect of the invention, there is provided a process for regenerating a coked or partially coked molecular sieve catalyst. This process includes contacting the coked or partially coked molecular sieve catalyst with a supercritical fluid to extract at least a portion of the coke from cages of the catalyst.

In one embodiment, the supercritical fluid is contacted with the coked or partially coked molecular sieve catalyst at a temperature of not greater than 300° C. In another embodiment, the supercritical fluid is contacted with the coked or partially coked molecular sieve catalyst at a pressure of not less than 50 bar. In embodiment, the supercritical fluid is $CO_2$.

According to yet another aspect of the invention, there is provided a process for forming a co-catalyst within a molecular sieve catalyst. This process includes contacting the molecular sieve catalyst having a porous framework structure with a pre-treatment composition at supercritical conditions in a pre-treatment zone to form an integrated hydrocarbon co-catalyst within the porous framework of the molecular sieve. In one embodiment, the pre-treatment composition includes one or more aromatic hydrocarbons.

According to yet another aspect of the invention, there is provided a process for activating a molecular sieve catalyst. This process includes contacting a supercritical fluid within the molecular sieve catalyst having pores within which a template is disposed to remove the template from the catalyst pores. In one embodiment, the supercritical fluid is $CO_2$.

DETAILED DESCRIPTION OF THE INVENTION

I. Forming of Olefin Product from Supercritical Oxygenate

This invention, in one aspect, is directed to a process for forming olefin product. The olefin-forming process is carried out by contacting supercritical oxygenate with an olefin-forming catalyst to form an olefin product. According to this invention, supercritical oxygenate refers to an oxygenate-containing composition that is in the supercritical phase. The oxygenate can be in the supercritical phase before, during, and/or after contacting the olefin-forming catalyst. Preferably, the oxygenate is in the supercritical phase at least during, and more preferably also prior to, contacting the olefin-forming catalyst.

Carrying out the process using supercritical oxygenate provides significant advantages relative to typical low pressure processes that are not at the supercritical state. Supercritical oxygenate processing provides fluid characteristics that exhibit liquid-like densities and solvencies, gas-like transport properties (e.g., diffusivity and viscosity), and relatively low surface tension (e.g., facile penetration into microporous materials). Additionally, forming olefin product from supercritical oxygenate processing reduces coke formation, improves mass transfer, and reduces reactor size.

Supercritical oxygenate processing also enables co-catalyst formation within the oxygenate-forming catalyst to be more efficiently carried out. This co-catalyst is generally in the form of a hydrocarbon ring structure, and this hydrocarbon ring is typically formed at or near to the location of the active catalyst site prior to converting the oxygenate to olefin product. Using supercritical oxygenate processing significantly reduces the time required for co-catalyst formation, resulting in a much more efficient formation of desired product, particularly ethylene and propylene in the olefin product.

The formation of unwanted coke by-product during conversion of oxygenate to olefin can also be significantly reduced using supercritical oxygenate, which can significantly increase the lifetime of the catalyst, meaning that the process can run for a relatively long period of time before having to regenerate coked catalyst.

II. Oxygenate Feed and Process Conditions

The oxygenate that is used in this invention is generally a feedstock that contains one or more oxygenates, more specifically, one or more organic compound(s) containing at least one oxygen atom. Preferably, the oxygenate in the feedstock includes one or more alcohol(s), preferably aliphatic alcohol(s) where the aliphatic moiety of the alcohol(s) has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts.

Non-limiting examples of specific types of oxygenates useful in the invention include methanol, ethanol, n-propanol, isopropanol, methyl ethyl ether, dimethyl ether, diethyl ether, di-isopropyl ether, formaldehyde, dimethyl carbonate, dimethyl ketone, acetic acid, and mixtures thereof. In a preferred embodiment, the feedstock contains at least one oxygenate selected from the group consisting of methanol, ethanol, dimethyl ether, and diethyl ether; more preferably the oxygenate feed contains methanol and/or dimethyl ether, and most preferably the oxygenate feed contains methanol.

The feedstock is converted primarily into one or more olefin(s). The olefin(s) produced from the feedstock typically have from 2 to 30 carbon atoms, preferably 2 to 8 carbon atoms, more preferably 2 to 6 carbon atoms, still more preferably 2 to 4 carbons atoms, and most preferably are ethylene and/or propylene.

According to the invention, the amount of olefin(s) produced, based on the total weight of hydrocarbon produced, is greater than 50 weight percent, typically greater than 60 weight percent, such as greater than 70 weight percent, and preferably greater than 75 weight percent. In one embodiment, the amount of ethylene and/or propylene produced based on the total weight of hydrocarbon product produced is greater than 65 weight percent, such as greater than 70 weight percent, for example greater than 75 weight percent, and preferably greater than 78 weight percent. Typically, the amount of ethylene produced in weight percent based on the total weight of hydrocarbon product produced, is greater than 30 weight percent, such as greater than 35 weight percent, for example greater than 40 weight percent. In addition, the amount of propylene produced in weight percent based on the total weight of hydrocarbon product produced is greater than 20 weight percent, such as greater than 25 weight percent, for example greater than 30 weight percent, and preferably greater than 35 weight percent.

In addition to the oxygenate component, the feedstock may optionally contain one or more diluent(s), which are generally non-reactive to the feedstock or molecular sieve catalyst composition and are typically used to reduce the concentration of the feedstock. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. In one embodiment, the diluents include water and/or nitrogen, with water being particularly preferred. Less desirable are diluents that can have relatively unsafe interactions with the feedstock and/or products, e.g. including $NO_x$ compounds such as $N_2O$, $NO$, $NO_2$, $N_2O_3$, $N_2O_5$, and combinations thereof, which can be explosive when combined with certain hydrocarbons.

The diluent may be used either in a liquid or a vapor form, or a combination thereof. The diluent may be either added directly to the feedstock entering a reactor or added directly to the reactor, or added with the molecular sieve catalyst composition.

The process can be conducted over a wide range of reactor temperatures as long as the oxygenate is in the supercritical phase and/or as long as the reactor conditions are maintained in a supercritical state for the particular (non-solid phase)

reactor contents and desired hydrocarbon conversion level (in a preferred embodiment, the supercritical state can apply to all conversion levels, instead of just the desired conversion level). For example, when the oxygenate contains a significant content of methanol, preferably at least 50 wt % methanol, average reactor temperatures are at least 240° C., preferably at least 300° C., and more preferably at least 350° C. Preferably, the average reactor temperatures are in the range of from about 240° C. to about 800° C.; more preferably from about 250° C. to about 750° C., or from about 300° C. to about 650° C., or from about 350° C. to about 600° C., and most preferably from about 350° C. to about 550° C.

Similarly, the process can be conducted over a wide range of pressures as long as the oxygenate is in the supercritical phase and/or as long as the reactor conditions are maintained in a supercritical state for the particular (non-solid phase) reactor contents and desired hydrocarbon conversion level (in one embodiment, the supercritical state can apply to all conversion levels, instead of just the desired conversion level). Typically, the total pressure of the system at which the oxygenate is to be in the supercritical phase (i.e., the supercritical oxygenate) is at least 90 bar. Preferably, the supercritical oxygenate is at a pressure of at least 100 bar, more preferably at least 150 bar, and most preferably at least 200 bar. Preferably, the supercritical oxygenate is at a pressure of from 90 bar to 400 bar, more preferably from 100 bar to 300 bar, for example from 110 bar to 250 bar.

When there are non-solid phase (in particular, gaseous phase) compounds other than the oxygenate in the reaction zone of the reactor, the total pressure of the reaction system at which the non-solid phase compounds (e.g., which can include, but are not limited to, reaction products such as olefins, reaction byproducts such as water, decomposition products, inert and/or unreactive components, or the like, or combinations thereof) can be in the supercritical phase can vary depending on the specific non-solid phase composition. Where a non-trivial amount of water is present, for example, the supercritical point for temperature and pressure can increase. In one such embodiment, the reactor, and thus the non-solid phase components therein, can be in a supercritical phase at a temperature of at least 275° C., for example at least 300° C., with a pressure of at least 200 bar, for example at least 220 bar, such as from 250 to 300 bar.

The process can take place in a variety of catalytic reactors. Non-limiting examples include dense bed, fluid bed and hybrid reactors that have a dense bed or fixed bed reaction zones and/or fast fluidized bed reaction zones coupled together, circulating fluidized bed reactors, riser reactors, and the like. Preferred reactors are fixed bed reactors.

In one embodiment, the process is conducted as a fixed bed process utilizing a reactor system, a regeneration system and a recovery system. Feedstock, preferably containing one or more oxygenates, optionally with one or more diluent(s), is fed to one or more reactor(s) to contact a molecular sieve catalyst composition and form olefin product.

In one embodiment, the feedstock is preferably fed to the reactor as a supercritical oxygenate composition. Additionally or alternately, the feedstock can be fed to the reactor and maintained in the reactor under supercritical conditions. In another embodiment, methanol is included in the feedstock, and the amount of methanol in the feed to the reactor is in the range of from 20 weight percent to about 98 weight percent, such as from about 40 weight percent to about 97 weight percent, or from about 50 weight percent to about 95 weight percent, based on the total weight of the feedstock including any diluent contained therein.

The feedstock entering the reactor system is preferably converted, partially or fully, in one or more reactors into an olefin product. In one embodiment, it is desired that the conversion of the feedstock be relatively high, so that the desired product can be formed in quantities as large as possible. In such a situation, the conversion of the oxygenate feedstock can be at least 70%, for example at least 75%, at least 80%, at least 85%, at least 90%, at least 95%, at least 98%, at least 99%, from 70% to 99%, from 80% to 98%, or from 85% to 99%. In another embodiment, it may be desired that the conversion of the feedstock be incomplete, in which case it could be desired that unconverted feedstock can entrain certain byproducts to act effectively as a diluent (although a reactive diluent).

A substantial amount of water is also typically formed as a by-product in the conversion process. In one embodiment, the olefin product is separated from any unconverted feed or water by-product by reducing the pressure, temperature, or both to below the supercritical state of the oxygenate. This reduction allows simple separation of the olefin product from the unconverted feed or by-product by vaporization of the olefin, as long as the oxygenate or water by-product is maintained in a separate state such as supercritical or liquid. Once the olefin is separated from the unconverted feedstock and water, the remaining feedstock can be recovered and recycled for further use. That is, the separated oxygenate can be converted back to the supercritical state or recycled in its continuous supercritical state to contact the olefin-forming catalyst and thus to form additional olefin product.

After separation of the olefin from the unconverted feedstock, the gaseous olefin can be sent to a recovery section of the system where the total olefin product can be separated into component parts. For example, ethylene and propylene, and well as any other olefin product, can be separated and recovered as separate products.

III. Catalyst Regeneration

Coked catalyst composition is withdrawn from the disengaging vessel and introduced to the regeneration system, e.g. continuously or at regular intervals, or alternately at least a portion (e.g., at least 3 wt %, at least 5 wt %, or at least 10 wt %; additionally or alternately 100%, less than 50%, less than 40%, less than 30%, less than 25%, less than 20%, or less than 15%) of the coked catalyst composition is exposed to regeneration conditions (again, e.g., continuously or at regular intervals). Regeneration generally refers to the process of removing coke and/or coke precursors from the catalyst pores via oxidation.

In one embodiment, the regeneration system comprises a regenerator where the coked catalyst composition is contacted with a regeneration medium, preferably a gas containing oxygen, under conventional regeneration conditions of temperature, pressure and residence time.

Non-limiting examples of suitable regeneration media include one or more of oxygen, $O_3$, $SO_3$, $N_2O$, NO, $NO_2$, $N_2O_5$, air, air diluted with nitrogen or carbon dioxide, oxygen and water, carbon monoxide, carbon dioxide, and/or hydrogen. In one embodiment, suitable regeneration conditions are those capable of burning coke from the coked catalyst composition, preferably to a level less than 0.5 weight percent based on the total weight of the coked molecular sieve catalyst composition entering the regeneration system. For example, the regeneration temperature may be in the range of from about 200° C. to about 1500° C., preferably from about 300° C. to about 1000° C., more preferably from about 450° C. to about 750° C., and most preferably from about 550° C. to 700° C. In one embodiment, the regeneration pressure may be in the range of from about 15 psia (103 kPaa) to about 500 psia (3448 kPaa), such as from about 20 psia (138 kPaa) to about 250 psia (1724 kPaa), including from about 25 psia (172 kPaa) to about 150 psia (1034 kPaa), and conveniently from about 30 psia (207 kPaa) to about 60 psia (414 kPaa).

The average residence time of the catalyst composition in the regenerator may be in the range of from about one minute to several hours, such as from about one minute to 100 minutes. The amount of oxygen in the regeneration flue gas (i.e., gas which leaves the regenerator) may be in the range of from about 0.01 mole percent to about 5 mole percent based on the total volume of the gas. The amount of oxygen in the gas used to regenerate the coked catalyst (i.e., fresh or feed gas) is typically at least about 15 mole percent, preferably at least about 20 mole percent, and more preferably from about 20 mole percent to about 30 mole percent, based on total amount of regeneration gas fed to the regenerator.

The burning of coke in the regeneration step is an exothermic reaction, and in an embodiment, the temperature within the regeneration system is controlled by various techniques in the art including feeding a cooled gas to the regenerator vessel, operated either in a batch, continuous, or semi-continuous mode, or a combination thereof. A preferred technique involves withdrawing the regenerated catalyst composition from the regeneration system and passing it through a catalyst cooler to form a cooled regenerated catalyst composition. The catalyst cooler, in an embodiment, is a heat exchanger that is located either internal or external to the regeneration system.

In one embodiment, the regenerated catalyst composition is withdrawn from the regeneration system, preferably from the catalyst cooler, and combined with a fresh molecular sieve catalyst composition and/or re-circulated molecular sieve catalyst composition and/or feedstock and/or fresh gas or liquids, and returned to the riser reactor(s). In another embodiment, the regenerated catalyst composition is withdrawn from the regeneration system and returned to the riser reactor(s) directly, preferably after passing through a catalyst cooler. A carrier, such as an inert gas, feedstock vapor, steam or the like, may be used, semi-continuously or continuously, to facilitate the introduction of the regenerated catalyst composition to the reactor system, preferably to the one or more riser reactor(s). By controlling the flow of the regenerated catalyst composition or cooled regenerated catalyst composition from the regeneration system to the reactor system, the optimum level of coke on the molecular sieve catalyst composition entering the reactor is maintained.

In another embodiment, the deactivated or partially deactivated catalyst is contacted with a supercritical fluid to extract coke and coke precursors from the catalyst cages at modest temperatures and high pressures (<300 C and >50 bar respectively). In one embodiment, for example where the reactor system includes two reactors (e.g., two fixed bed reactors) operating in parallel, the coked catalyst can remain in the reactor during regeneration, e.g. with one reactor being active in MTO while the other reactor is being regenerated. In another embodiment, for example where the reactor system includes a single reactor (e.g., a riser reactor), a portion of the coked catalyst can be sent to a regeneration system. One suitable means of achieving this extraction would be to contact the deactivated or partially deactivated catalyst solids with supercritical $CO_2$ (>73 bar, 31.1° C.). The solids and supercritical fluid containing the extracted coke precursors are then separated from one another by, for example, a settling chamber or by a flash distillation. The supercritical fluid and the extracted coke precursors can be further separated and the supercritical fluid recovered for further use. The so-regenerated solids can then be re-used in the reaction process. In another embodiment, the regeneration step can include a supercritical fluid extraction aspect and a conventional oxidative regeneration aspect, though, in this embodiment, the conventional oxidative regeneration aspect may occur at conditions that are relatively milder (i.e., lower temperature, lower pressure, shorter average residence time, lower oxygen content, etc., or combinations thereof) conditions than those used when conventional oxidative regeneration is used without a supercritical fluid extraction aspect. Without being bound by theory, it is believed that supercritical fluid media can advantageously be more effective in interacting with coke and/or its precursors (e.g., whether through enhanced salvation, through increased physico-chemical interaction, through some other mechanism, or through some combination thereof), such that synergistic efficiencies can result in the regeneration system.

Coke levels on the catalyst composition can be measured by withdrawing the catalyst composition from the conversion process and determining its carbon content. Typical levels of coke on the molecular sieve catalyst composition, after regeneration, are in the range of from 0.01 weight percent to about 15 weight percent, such as from about 0.1 weight percent to about 10 weight percent, for example from about 0.2 weight percent to about 5 weight percent, and conveniently from about 0.3 weight percent to about 2 weight percent based on the weight of the molecular sieve.

IV. Catalyst

Preferred olefin-forming catalysts are molecular sieve catalysts capable of converting an oxygenate to an olefin compound. Non-limiting examples of such olefin-forming catalysts include zeolites as well as non-zeolites, and are of the large-, medium- or small-pore type. Small and medium-pore molecular sieves are preferred in one embodiment of this invention, however (e.g., medium pore zeolites are typically preferred for methanol-to-gasoline and methanol-to-propylene reactions/products, while small pore materials are preferred for methanol-to-olefins reactions/products, which olefins are predominantly ethylene and propylene). As defined herein, small-pore molecular sieves have a pore size of less than or equal to about 5.0 angstroms. Generally, suitable catalysts have a pore size ranging from about 3.5 to about 5.0 angstroms, preferably from about 3.5 to about 4.8 angstroms, and most preferably from about 3.5 to about 4.6 angstroms. Medium pore molecular sieves have a pore size of up to about 6 angstroms.

Zeolites include materials containing silica and optionally alumina, and materials in which the silica and alumina portions have been replaced in whole or in part with other oxides. For example, germanium oxide, tin oxide, and mixtures thereof can replace the silica portion. Boron oxide, iron oxide, gallium oxide, indium oxide, and mixtures thereof can replace the alumina portion. Unless otherwise specified, the terms "zeolite" and "zeolite material" as used herein, shall mean not only materials containing silicon atoms and, optionally, aluminum atoms in the crystalline lattice structure thereof, but also materials which contain suitable replacement atoms for such silicon and aluminum atoms.

One type of olefin-forming catalyst capable of producing large quantities of ethylene and propylene is a silicoaluminophosphate (SAPO) molecular sieve. Silicoaluminophosphate molecular sieves are generally classified as being microporous materials having 8-, 10-, or 12-membered ring structures. These ring structures can have an average pore size ranging from about 3.5 to about 15 angstroms. Preferred are the small and medium-pore SAPO molecular sieves, having the pore sizes as described above.

According to one embodiment, substituted SAPOs can also be used in oxygenate to olefin reaction processes. These compounds are generally known as MeAPSOs or metal-containing silicoaluminophosphates. The metal can be alkali metal ions (Group IA), alkaline earth metal ions (Group IIA), rare earth ions (Group IIIB, including the lanthanoid elements: lanthanum, cerium, praseodymium, neodymium, samarium, europium, gadolinium, terbium, dysprosium, holmium, erbium, thulium, ytterbium and lutetium; and scandium or yttrium), and the additional transition cations of Groups IVB, VB, VIIB, VIIB, VIIIB, and IB.

Preferably, the Me represents atoms such as Zn, Mg, Mn, Co, Ni, Ga, Fe, Ti, Zr, Ge, Sn, and Cr. These atoms can be inserted into the tetrahedral framework through a [MeO$_2$] tetrahedral unit. The [MeO$_2$] tetrahedral unit carries a net electric charge depending on the valence state of the metal substituent. When the metal component has a valence state of +2, +3, +4, +5, or +6, the net electric charge is between −2 and +2. Incorporation of the metal component is typically accomplished by adding the metal component during synthesis of the molecular sieve. However, post-synthesis ion exchange can also be used. In post synthesis exchange, the metal component will introduce cations into ion-exchange positions at an open surface of the molecular sieve, not into the framework itself.

Suitable silicoaluminophosphate molecular sieves include, but are not limited to, SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, the metal containing forms thereof, and mixtures thereof. Preferred are SAPO-18, SAPO-34, SAPO-35, SAPO-44, and SAPO-47, particularly SAPO-18 and SAPO-34, including the metal containing forms thereof, and mixtures thereof. As used herein, the term mixture is synonymous with combination and is considered a composition of matter having two or more components in varying proportions, regardless of their physical state.

An aluminophosphate (ALPO) molecular sieve can also be included in the catalyst composition. Aluminophosphate molecular sieves are crystalline microporous oxides, which can have an AlPO$_4$ framework. They can have additional elements within the framework, typically have uniform pore dimensions ranging from about 3 angstroms to about 10 angstroms, and are capable of making size selective separations of molecular species. More than two dozen structure types have been reported, including zeolite topological analogues. Preferred ALPO structures include, but are not limited to, ALPO-5, ALPO-11, ALPO-18, ALPO-31, ALPO-34, ALPO-36, ALPO-37, and ALPO-46.

The ALPOs can also include metal substituents in their frameworks. When present, preferably the metal is selected from the group consisting of magnesium, manganese, zinc, cobalt, and mixtures thereof. These materials preferably exhibit adsorption, ion-exchange and/or catalytic properties similar to aluminosilicate, aluminophosphate and silica aluminophosphate molecular sieve compositions.

The metal containing ALPOs have a three-dimensional microporous crystal framework structure of MO$_2$, AlO$_2$ and PO$_2$ tetrahedral units. These as manufactured structures (which contain template prior to calcination) can be represented by an empirical chemical composition, on an anhydrous basis, as mR:(M$_x$Al$_y$P$_z$)O$_2$, wherein "R" represents at least one organic templating agent present in the intracrystalline pore system; "m" represents the moles of "R" present per mole of (M$_x$Al$_y$P$_z$)O$_2$ and has a value of from zero to 0.3, the maximum value in each case depending upon the molecular dimensions of the templating agent and the available void volume of the pore system of the particular metal aluminophosphate involved, "x," "y," and "z" represent the mole fractions of the metal "M," (i.e. magnesium, manganese, zinc and cobalt), aluminum and phosphorus, respectively, present as tetrahedral oxides.

The metal containing ALPOs are sometimes referred to by the acronym as MeAPO. Also in those cases where the metal "Me" in the composition is magnesium, the acronym MAPO is applied to the composition. Similarly ZAPO, MnAPO, and CoAPO are applied to the compositions which contain zinc, manganese and cobalt respectively. To identify the various structural species which make up each of the subgeneric classes MAPO, ZAPO, CoAPO, and MnAPO, each species is assigned a number and is identified, for example, as ZAPO-5, MAPO-11, CoAPO-34, and so forth.

Materials can be blended with the molecular sieve to form what is generally referred to as formulated catalyst. Such blended materials can be various inert or catalytically active materials, or various binder materials. These materials include compositions such as kaolin and other clays, various forms of rare earth metals, metal oxides, other non-zeolite catalyst components, zeolite catalyst components, alumina or alumina sol, titania, zirconia, magnesia, thoria, beryllia, quartz, silica or silica or silica sol, and mixtures thereof. These components are also effective in reducing, inter alia, overall catalyst cost, and acting as a thermal sink to assist in heat shielding the catalyst during regeneration, densifying the catalyst and increasing catalyst strength. It is particularly desirable that the inert materials that are used in the catalyst to act as a thermal sink have a heat capacity of from about 0.05 to about 1 cal/g-° C., more preferably from about 0.1 to about 0.8 cal/g-° C., most preferably from about 0.1 to about 0.5 cal/g-° C.

The catalyst composition, according to an embodiment, preferably comprises from about 1% to about 99%, more preferably from about 5% to about 90%, and most preferably from about 10% to about 80%, by weight of molecular sieve. It is also preferred that the catalyst composition have a particle size of from about 20 microns to about 3,000 microns, more preferably, for fluidized bed/riser reactor systems, from about 22 microns to about 200 microns or from about 25 microns to about 150 microns. In reactors where the catalyst is not as mobile, e.g. fixed bed and/or CCR reactors, the preferred catalyst composition particle size can be considerably higher, such as from about 0.5 to about 20 mm, more preferably from about 1 mm to 15 mm.

A molecular sieve catalyst particularly useful in making ethylene and propylene is a catalyst, which contains a combination of SAPO-34, and SAPO-18 or ALPO-18 molecular sieve. In a particular embodiment, the molecular sieve is a crystalline intergrowth of SAPO-34, and SAPO-18 or ALPO-18.

The molecular sieves used in the catalyst of this invention are typically synthesized by hydrothermal crystallization. In one embodiment, a reaction mixture is formed by mixing together one or more of reactive silicon, aluminum and phosphorus components, along with at least one template. Preferably, the mixture is sealed and heated, preferably under autogenous pressure, to a temperature of at least 100° C., more preferably from 100-250° C., until a crystalline product is formed. Formation of the crystalline product can take anywhere from around 2 hours to as much as 2 weeks. In some cases, stirring or seeding with crystalline material will facilitate the formation of the product.

Preferably, the molecular sieve product is formed in solution. It can be recovered by any of various means, including by centrifugation or filtration. The product is preferably washed, recovered by the same means, and dried.

As a result of the crystallization process, the recovered sieve contains within its pores at least a portion of the template used in making the initial reaction mixture. The crystalline structure essentially wraps around the template, and the template must be removed to obtain catalytic activity. Once the template is removed, the crystalline structure that remains has what is typically called an intracrystalline pore system.

The molecular sieve can be made using one or more templates. Templates are structure directing agents, and typically contain nitrogen, phosphorus, oxygen, carbon, hydrogen or a combination thereof, and can also contain at least one alkyl or aryl group, with 1 to 8 carbons being present in the alkyl or aryl group. Mixtures of two or more templates can produce mixtures of different sieves or predominantly one sieve where one template is more strongly directing than another.

Representative templates include tetraethyl ammonium salts, cyclopentylamine, aminomethyl cyclohexane, piperidine, triethylamine, cyclohexylamine, tri-ethyl hydroxyethylamine, morpholine, dipropylamine (DPA), pyridine, isopropylamine and combinations thereof. Preferred templates are triethylamine, cyclohexylamine, piperidine, pyridine, isopropylamine, tetraethyl ammonium salts, and mixtures thereof. The tetraethylammonium salts can include tetraethyl ammonium hydroxide (TEAOH), tetraethyl ammonium phosphate, tetraethyl ammonium fluoride, tetraethyl ammonium bromide, tetraethyl ammonium chloride, tetraethyl ammonium acetate, and combinations thereof. Preferred tetraethyl ammonium salts are tetraethyl ammonium hydroxide and tetraethyl ammonium phosphate.

The molecular sieve or catalyst containing the molecular sieve must be activated prior to use in a catalytic process. Activation is performed in such a manner that template is removed from the molecular sieve, leaving active catalytic sites with the microporous channels of the molecular sieve open for contact with feed.

In one embodiment, the molecular sieve or catalyst containing the molecular sieve is activated by calcining, or essentially heating the template at a temperature of from 200 to 800° C. in the presence of an oxygen-containing gas. In one embodiment, the molecular sieve or catalyst containing the molecular sieve in an environment having a low oxygen concentration. This type of process can be used for partial or complete removal of the template from the intracrystalline pore system. In other embodiments, particularly with smaller templates, complete or partial removal from the sieve can be accomplished by desorption processes such as those used in making standard zeolites.

In one embodiment, the template can be removed by contacting molecular sieve or catalyst containing the molecular sieve with a supercritical fluid to remove the template from the catalyst cages. Preferably, the molecular sieve or catalyst containing the molecular sieve is contacted with the fluid at modest temperatures and high pressures (<300 C and >50 bar respectively). In one embodiment, the fluid is supercritical $CO_2$ (>73 bar, 31.1° C.). The molecular sieve solids and supercritical fluid containing the template can then be separated from one another by, for example, a settling chamber or by a flash distillation. The supercritical fluid and the template can be further separated and the supercritical fluid recovered for further use. The molecular sieve can then advantageously be in the activated state and can be effectively used in the reaction process. In another embodiment, template removal can include both a supercritical fluid removal step and a conventional calcining step, though, in this embodiment, the conventional calcining step can occur at relatively milder conditions than those used when conventional calcining is used without a supercritical fluid removal step.

V. Catalyst Pre-Treatment

In one embodiment of the invention, fresh, regenerated, or a combination of fresh and regenerated molecular sieve can be pre-treated with a pre-treatment composition in a pre-treatment zone to form an integrated hydrocarbon co-catalyst within the porous framework of the molecular sieve. Examples of pre-treatment compositions include, but are not limited to, aromatic hydrocarbons. Such examples include pyridine, benzene, toluene, xylenes, tri- and tetra-methyl substituted benzenes, and the like. Benzene molecules substituted with alkyl side chains larger than methyl may also be used; these include ethyl and propyl benzene and multiple substitutions of a combination of methyl, ethyl, and propyl alkyl side chains.

Effective pre-treatment of the molecular sieve is obtained over a wide range of temperatures, pressures and space velocities. In one embodiment, the pre-treatment is carried out at supercritical conditions such that the pre-treatment composition remains in the supercritical state. Preferably, the pre-treatment is carried out at a pressure of at least 100 bar.

Pre-treatment of the molecular sieve is particularly effective on fresh, activated catalyst, or regenerated catalyst. Such catalyst is substantially low in total carbon content. As the fresh or regenerated catalyst contacts the pre-treatment composition, the integrated hydrocarbon co-catalyst can form within the internal pore structure of the molecular sieve catalyst. In one embodiment, the molecular sieve that contacts the pre-treatment composition to form the integrated hydrocarbon co-catalyst has a total carbon content of not greater than about 2 wt % prior to contact with the pre-treatment composition. Preferably, the molecular sieve catalyst that contacts the pre-treatment composition has a total carbon content of not greater than about 1.5 wt %, more preferably not greater than about 1 wt %, and most preferably not greater than about 0.5 wt %, prior to contact with the pre-treatment composition.

Following pre-treatment, the molecular sieve typically contains the integrated hydrocarbon co-catalyst, which can be an aromatic compound, within the various cages of the internal pore structure. Additionally or alternatively to using SSNMR to determine appropriate pre-treatment of the molecular sieve, another embodiment involves measuring hydrocarbon content of the molecular sieve that has contacted the pre-treatment composition. In one embodiment, the molecular sieve containing the integrated hydrocarbon co-catalyst has a hydrocarbon content of at least 0.1 wt %, preferably at least 1 wt %, more preferably at least about 5 wt %, for example, at least about 10 wt %, based on total weight of the molecular sieve, which excludes non-molecular sieve components such as binder, matrix, etc., which are optionally present in a catalyst composition.

The pre-treatment zone can be contained in a separate pre-treatment zone or within a reactor vessel where the catalytic conversion of oxygenate to olefin takes place. In one embodiment, a separate pre-treatment vessel is used. In a particular embodiment, the pre-treatment vessel is an auxiliary fluidized bed reactor associated with the oxygenate conversion reactor and regenerator system. The auxiliary reactor should be capable of continuously receiving catalyst from the regenerator and subsequently supplying pre-treated catalyst to the oxygenate conversion reactor.

In another embodiment, pre-treatment can be carried out within the same vessel where the catalytic conversion of oxygenate to olefin product takes place. Preferably, two separate temperature zones are maintained to get proper introduction of hydrocarbon and formation of the integrated hydrocarbon co-catalyst. In one aspect, the molecular sieve to be pre-treated is introduced into one zone along with the pre-treatment composition to form the integrated hydrocarbon co-catalyst. Then, the pre-treated molecular sieve containing the integrated hydrocarbon co-catalyst can be sent to the other zone and contacted with oxygenate to convert the oxygenate to olefin product. Operating conditions in the two zones can be controlled for pre-treatment and oxygenate reaction conditions. Either zone or both zones optionally include heating and/or cooling equipment such as heat exchangers, steam coils, and cooling coils. In one embodiment, the pre-treatment zone includes cooling equipment.

VI. Product Recovery

The olefin that is separated from the unconverted feedstock and water by-product is preferably further processed to isolate and purify the various olefin components, particularly, ethylene and propylene. Any variety of recovery systems, techniques and sequences can be used to separate the desired olefin components. Such recovery systems generally comprise one or more or a combination of various separation, fractionation and/or distillation towers, columns, splitters, or trains, reaction systems and other associated equipment, for example, various condensers, heat exchangers, refrigeration systems or chill trains, compressors, knock-out drums or pots, pumps, and the like. Non-limiting examples of equipment used in a recovery system include one or more of a demethanizer, preferably a high-temperature demethanizer, a deethanizer, a depropanizer, membranes, ethylene ($C_2$) splitter, propylene ($C_3$) splitter, butene ($C_4$) splitter, and the like.

Generally accompanying most recovery systems is the production, generation or accumulation of additional products, by-products and/or contaminants along with the preferred products. Examples of preferred products include light olefins, such as ethylene, propylene and/or butylene. Such products are typically purified for use in derivative manufacturing processes such as polymerization processes. In a preferred embodiment of the recovery system, the recovery system also includes a purification system. For example, light olefins produced particularly in an oxygenate-to-olefin process are passed through a purification system that removes low levels of by-products or contaminants. Non-limiting examples of contaminants and by-products include generally polar compounds such as water, alcohols, aldehydes, ketones, carboxylic acids, ethers, carbon oxides, ammonia and other nitrogen compounds, arsine, phosphine and chlorides. Other contaminants or by-products include hydrogen and hydrocarbons such as acetylene, methyl acetylene, propadiene, butadiene and butyne.

Typically, in converting one or more oxygenates to olefins having 2 or 3 carbon atoms, an amount of hydrocarbons, particularly olefins, especially olefins having 4 or more carbon atoms, and other by-products are formed or produced. Included in the recovery systems of the invention are reaction systems for converting the products contained within the olefin product stream withdrawn from the reactor or converting those products produced as a result of the recovery system utilized.

In one embodiment, the olefin product stream is passed through a recovery system producing one or more hydrocarbon containing streams, in particular, a three or more carbon atom ($C_{3+}$) hydrocarbon containing stream. In this embodiment, the $C_{3+}$ hydrocarbon containing stream is passed through a first fractionation zone producing a crude $C_3$ hydrocarbon and a $C_{4+}$ hydrocarbon containing stream, the $C_{4+}$ hydrocarbon containing stream is passed through a second fractionation zone producing a crude $C_4$ hydrocarbon and a $C_{5+}$ hydrocarbon containing stream. The four-or-more-carbon hydrocarbons include butenes such as butene-1 and butene-2, butadienes, saturated butanes, and isobutanes.

The olefin product stream removed from a conversion process, particularly an oxygenate-to-olefin process, typically contains hydrocarbons having 4 or more carbon atoms. The amount of hydrocarbons having 4 or more carbon atoms is typically in an amount less than 30 weight percent, preferably less than 25 weight percent, and most preferably less than 20 weight percent, based on the total weight of the olefin product stream withdrawn from an oxygenate-to-olefin process, excluding water. In particular with a conversion process of oxygenates into olefins utilizing a molecular sieve catalyst composition the resulting olefin product stream typically comprises a majority of ethylene and/or propylene and a lesser amount of four-carbon and higher carbon number products and other by-products, excluding water.

The preferred light olefins produced by any one of the processes described above, preferably conversion processes, are high-purity prime olefin products that contain a $C_x$ olefin, wherein x is a number from 2 to 4, in an amount greater than 80 wt %, preferably greater than 90 wt %, more preferably greater than 95 wt %, and most preferably no less than about 99 wt %, based on the total weight of the olefin.

In one embodiment, the olefin product stream is recovered at supercritical conditions in which the products emerge from the reactor in the supercritical phase. In a particular embodiment, the product stream is reduced in pressure such that water is condensed with condensing the $C_4+$ hydrocarbons. Preferably, the pressure is reduced to no higher than 30 bar. The water and $C_4+$ hydrocarbons are preferably separated and the $C_4+$ hydrocarbons are preferably passed through the recovery system.

VII. Olefin Product Use

Olefins recovered from the recovery system can be used in any variety of ways. For example, the $C_4$ hydrocarbons, butene-1 and butene-2 are used to make alcohols having 8 to 13 carbon atoms, and other specialty chemicals and isobutylene is used to make a gasoline additive, methyl-t-butylether, and isobutylene elastomers.

In another embodiment, recovered olefins are directed to one or more polymerization processes for producing various polyolefins. Polymerization processes include solution, gas phase, slurry phase and high pressure, or a combination thereof. Particularly preferred is a gas-phase or a slurry-phase polymerization of one or more olefins at least one of which is ethylene or propylene.

Examples of polymerization catalysts include Ziegler-Natta, Phillips-type, metallocene, metallocene-type polymerization catalysts, and mixtures thereof.

In one embodiment, the present invention comprises a polymerizing process of one or more olefins in the presence of a polymerization catalyst system in a polymerization reactor to produce one or more polymer products, wherein the one or more olefins have been made by converting an alcohol, particularly methanol, using a zeolite or zeolite-type molecular sieve catalyst composition. A preferred polymerization process is a gas-phase polymerization process and at least one of the olefins is either ethylene or propylene, and preferably the polymerization catalyst system is a supported metallocene catalyst system. In this embodiment, the supported metallocene catalyst system comprises a support, a metallocene or metallocene-type compound and an activator, preferably the activator is a non-coordinating anion or alumoxane, or combination thereof, and most preferably the activator is alumoxane.

Polymerization conditions vary depending on the polymerization process, polymerization catalyst system and the polyolefin produced. Typical conditions of polymerization pressure vary from about 100 psig (690 kPag) to greater than about 1000 psig (3448 kPag), preferably in the range of from about 200 psig (1379 kPag) to about 500 psig (3448 kPag), and more preferably in the range of from about 250 psig (1724 kPag) to about 350 psig (2414 kPag). Typical conditions of polymerization temperature vary from about 0° C. to about 500° C., preferably from about 30° C. to about 350° C., more preferably in the range of from about 60° C. to 250° C., and most preferably in the range of from about 70° C. to about 150° C. In the preferred polymerization process the amount of polymer being produced per hour is greater than 25,000 lbs/hr (11,300 Kg/hr), preferably greater than 35,000 lbs/hr (15,900 Kg/hr), more preferably greater than 50,000 lbs/hr (22,700 Kg/hr) and most preferably greater than 75,000 lbs/hr (29,000 Kg/hr).

The polymers that can be produced by the polymerization processes described above include, but are not limited to, linear low-density polyethylene, ethylene and/or propylene elastomers, ethylene- and/or propylene-based plastomers, high-density polyethylene, low-density polyethylene, polypropylenes, polyethylene copolymers, and polypropylene copolymers. The propylene-based polymers that can be produced by the polymerization processes include, but are not limited to, atactic polypropylene, isotactic polypropylene, syndiotactic polypropylene, and propylene random, block, or impact copolymers, inter alia. Copolymers that can be made using the olefin product formed according to the invention can include, but are not limited to, those in which one or more olefins, such as ethylene and/or propylene, are the majority component, with one or more other comonomers optionally being present, e.g. in amounts up to about 25 wt %, up to about 20 wt %, up to about 15 wt %, up to about 10 wt %, up to about 5 wt %, up to about 1 wt %, or the like.

Typical ethylene-based polymers have a density in the range of from 0.86 g/cc to 0.97 g/cc, a weight-average molecular weight to number-average molecular weight ratio (Mw/Mn) of greater than 1.5 to about 10 as measured by gel permeation chromatography, a melt index (I2) as measured by ASTM-D-1238-E in the range from 0.01 dg/min to 1000 dg/min, a melt index ratio (I21/I2) (I21 is measured by ASTM-D-1238-F) of from 10 to less than 25, alternatively a I21/I2 of from greater than 25, more preferably greater than 40.

Polymers produced by the polymerization process are useful in such forming operations as film, sheet, and fiber extrusion and co-extrusion as well as blow molding, injection molding and rotary molding; films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc., in food-contact and non-food-contact applications; fibers include melt spinning, solution spinning and melt blown fiber operations for use in woven or non-woven form to make filters, diaper fabrics, medical garments, geotextiles, etc.; extruded articles include medical tubing, wire and cable coatings, geomembranes, and pond liners; and molded articles include single and multi-layered constructions in the form of bottles, vessels, large hollow articles, rigid food containers and toys, etc.

In addition to polyolefins, numerous other olefin-derived products are formed from the olefins recovered in any one of the processes described above, particularly the conversion processes, more particularly the GTO process or MTO process. These include, but are not limited to, aldehydes, alcohols, acetic acid, linear alpha olefin(s), vinyl acetate, ethylene dichloride and vinyl chloride, ethylbenzene, ethylene oxide, cumene, isopropyl alcohol, acrolein, allyl chloride, propylene oxide, acrylic acid, ethylene-propylene elastomers, acrylonitrile, and dimers, trimers, and tetramers of ethylene, propylene or butylenes or mixtures thereof.

The principles and modes of operation of this invention have been described above with reference to various exemplary and preferred embodiments. As understood by those of skill in the art, the overall invention, as defined by the claims, can encompass other preferred embodiments that may not be specifically enumerated herein. These embodiments can include, but are not limited to:

Embodiment 1

A process for forming olefin product, comprising: contacting supercritical oxygenate with an olefin-forming catalyst to form an olefin product comprising olefin, water and unreacted oxygenate; reducing pressure, temperature or a combination of pressure and temperature of the olefin product below supercritical; and separating at least a portion of the olefin from the water and unreacted oxygenate.

Embodiment 2

A process for forming olefin product, comprising: contacting oxygenate with an olefin-forming catalyst in a reactor to form an olefin product comprising olefin, water, and unreacted oxygenate, wherein the reactor is maintained under temperature and pressure conditions such that at least the oxygenate and the olefin product are under supercritical conditions; reducing pressure, temperature, or a combination of pressure and temperature of the olefin product below supercritical; and separating at least a portion of the olefin from the water and unreacted oxygenate.

Embodiment 3

A process for regenerating a coked or partially coked molecular sieve catalyst, comprising contacting a supercritical fluid with a molecular sieve catalyst containing pores within which coke is disposed to extract at least a portion of the coke from pores of the catalyst.

Embodiment 4

A process for forming a co-catalyst within a molecular sieve catalyst, comprising contacting the molecular sieve catalyst having a porous framework structure with a pretreatment composition at supercritical conditions in a pretreatment zone to form an integrated hydrocarbon co-catalyst within the porous framework of the molecular sieve.

Embodiment 5

A process for activating a molecular sieve catalyst, comprising contacting with a supercritical fluid the molecular sieve catalyst having pores within which a template is disposed to remove the template from the catalyst pores.

Embodiment 6

The process of embodiment 1, wherein the supercritical oxygenate is at a pressure of at least 90 bar, at a temperature of at least 240° C., or both.

Embodiment 7

The process of embodiment 2, wherein the supercritical conditions comprise a pressure of at least 200 bar, a temperature of at least 275° C., or both.

Embodiment 8

The process of any of embodiments 1-2 and 6-7, wherein the separated oxygenate is converted to supercritical oxygenate and contacted with the olefin-forming catalyst.

Embodiment 9

The process of any of embodiments 1-2 and 6-8, wherein the pressure and temperature of the olefin product are reduced below supercritical prior to separating at least a portion of the olefin from the oxygenate.

Embodiment 10

The process of any of embodiments 1-2 and 6-9, wherein the supercritical oxygenate is contacted with the olefin-forming catalyst in a fixed bed reactor.

Embodiment 11

The process of embodiment 3, wherein the supercritical fluid is contacted with the at least partially coked molecular sieve catalyst at a temperature of not greater than 300° C.

Embodiment 12

The process of embodiment 3 or embodiment 11, wherein the supercritical fluid is contacted with the at least partially coked molecular sieve catalyst at a pressure of not less than 50 bar.

Embodiment 13

The process of embodiment 4, wherein the pre-treatment composition includes one or more aromatic hydrocarbons.

Embodiment 14

The process of any of embodiments 3, 5, and 11-12, wherein the supercritical fluid is $CO_2$.

What is claimed is:
1. A process for forming olefin product, comprising:
contacting supercritical oxygenate in a reactor with molecular sieve catalyst to form an olefin product comprising olefin, water and unreacted oxygenate at a temperature of at least 275° C. and a total reactor pressure of at least 200 bar (20 MPa) such that all non-solid phase components are supercritical, therein forming coked or partially coked molecular sieve catalyst;
reducing pressure, temperature or a combination of pressure and temperature of the olefin product below supercritical; and
separating at least a portion of the olefin from the water and unreacted oxygenate; and
wherein less than 30% of the molecular sieve catalyst is withdrawn from the reactor or reaction zone and exposed to regeneration conditions comprising contacting the coked or partially coked molecular sieve catalyst with a supercritical fluid to extract at least a portion of the coke from cages of the catalyst.
2. The process of claim 1, wherein the supercritical oxygenate is at a pressure of at least 220 (22 MPa) bar.
3. The process of claim 1, wherein the supercritical oxygenate is at a temperature of at least 300° C.
4. The process of claim 1, wherein the separated oxygenate is converted to supercritical oxygenate and contacted with the molecular sieve catalyst.
5. The process of claim 1, wherein the pressure and temperature of the olefin product are reduced below supercritical prior to separating at least a portion of the olefin from the oxygenate.
6. The process of claim 1, wherein the supercritical oxygenate is contacted with the molecular sieve catalyst in a fixed bed reactor.
7. A process for forming olefin product, comprising:
contacting oxygenate with molecular sieve catalyst in a reactor to form an olefin product comprising olefin, water, and unreacted oxygenate, wherein the reactor is maintained at a temperature of at least 275° C. and a total reactor pressure of at least 200 bar (20 MPa) such that all non-solid phase components are supercritical, therein forming coked or partially coked molecular sieve catalyst;
reducing pressure, temperature, or a combination of pressure and temperature of the olefin product below supercritical; and
separating at least a portion of the olefin from the water and unreacted oxygenate; and
wherein less than 30% of the molecular sieve catalyst is withdrawn from the reactor or reaction zone and exposed to regeneration conditions comprising contacting the coked or partially coked molecular sieve catalyst with a supercritical fluid to extract at least a portion of the coke from cages of the catalyst; and
further comprising contacting the regenerated molecular sieve catalyst having a porous framework structure with a pre-treatment composition at supercritical conditions in a pre-treatment zone to form an integrated hydrocarbon co-catalyst within the porous framework of the molecular sieve, the pre-treatment composition includes one or more aromatic hydrocarbons;
then, the pre-treated molecular sieve catalyst containing the integrated hydrocarbon co-catalyst is sent to the reactor and contacted with oxygenate to convert the oxygenate to olefin product.
8. The process of claim 7, wherein the supercritical conditions comprise a pressure of at least 220 (22 MPa) bar.
9. The process of claim 7, wherein the supercritical conditions comprise a temperature of at least 300° C.
10. The process of claim 7, wherein the pressure and temperature of the olefin product are reduced below supercritical prior to separating at least a portion of the olefin from the oxygenate.
11. The process of claim 1, wherein less than 20% of the molecular sieve catalyst is withdrawn from the reactor to be exposed to regeneration conditions.

12. The process of claim 1, wherein less than 15% of the molecular sieve catalyst is withdrawn from the reactor to be exposed to regeneration conditions.

13. The process of claim 7, wherein less than 20% of the molecular sieve catalyst is withdrawn from the reactor to be exposed to regeneration conditions.

14. The process of claim 7, wherein less than 15% of the molecular sieve catalyst is withdrawn from the reactor to be exposed to regeneration conditions.

* * * * *